US009866450B2

(12) United States Patent
Box et al.

(10) Patent No.: US 9,866,450 B2
(45) Date of Patent: Jan. 9, 2018

(54) METHODS AND APPARATUS RELATED TO MANAGEMENT OF UNIT-BASED VIRTUAL RESOURCES WITHIN A DATA CENTER ENVIRONMENT

(71) Applicant: Virtustream IP Holding Company LLC, Bethesda, MD (US)

(72) Inventors: Julian J. Box, St Helier (JE); Kevin D. Reid, Bethesda, MD (US); Karl J. Simpson, St Helier (JE)

(73) Assignee: Virtustream IP Holding Company LLC, Bethesda, MD (US)

( * ) Notice: Subject to any disclaimer, the term of this patent is extended or adjusted under 35 U.S.C. 154(b) by 30 days.

(21) Appl. No.: 14/812,817

(22) Filed: Jul. 29, 2015

(65) Prior Publication Data
US 2015/0333977 A1 Nov. 19, 2015

Related U.S. Application Data

(63) Continuation of application No. 12/709,962, filed on Feb. 22, 2010, now Pat. No. 9,122,538.

(51) Int. Cl.
*G06F 15/173* (2006.01)
*H04L 12/24* (2006.01)
(Continued)

(52) U.S. Cl.
CPC ........ *H04L 41/5051* (2013.01); *G06F 9/5027* (2013.01); *G06F 9/5072* (2013.01);
(Continued)

(58) Field of Classification Search
CPC .... G06F 9/5077; G06F 9/5072; G06F 9/5027; G06F 2209/501; H04L 41/5051; H04L 41/5025; H04L 67/10
(Continued)

(56) References Cited

U.S. PATENT DOCUMENTS 7,194,616 B2  3/2007 Axnix
7,664,110 B1  2/2010 Lovett
(Continued)

FOREIGN PATENT DOCUMENTS

CN  1333508   1/2002
EP  1 170 662  1/2002
(Continued)

OTHER PUBLICATIONS

International Search Report and Written Opinion issued in PCT/US2011/025392 dated Jun. 2, 2011.
(Continued)

*Primary Examiner* — Philip Chea
*Assistant Examiner* — Wing Ma
(74) *Attorney, Agent, or Firm* — Ryan, Mason & Lewis, LLP

(57) ABSTRACT

In one embodiment, a processor-readable medium can be configured to store code representing instructions to be executed by a processor. The code can include code to receive a request to change a value representing a number of data center units included in a set of data center units assigned to a user. Each of the data center units from the set of data center units can be associated with hardware resources managed based on a set of predefined hardware resource limit values. The code can include code to determine, in response to the request, whether hardware resources of a data center unit mutually exclusive from hardware resources of the set of data center units and managed based on the set of predefined resource limit values is available for assignment to the user when the request to change is an increase request.

21 Claims, 5 Drawing Sheets

(51) Int. Cl.
*H04L 29/08* (2006.01)
*G06F 9/50* (2006.01)

(52) U.S. Cl.
CPC ........ *G06F 9/5077* (2013.01); *H04L 41/5025* (2013.01); *H04L 67/10* (2013.01); *G06F 2209/501* (2013.01)

(58) Field of Classification Search
USPC ................................ 709/224, 226; 718/104
See application file for complete search history.

(56) References Cited

U.S. PATENT DOCUMENTS

| | | | |
|---|---|---|---|
| 7,908,605 B1 | 3/2011 | Graupner | |
| 7,941,804 B1 | 5/2011 | Herington | |
| 8,234,650 B1* | 7/2012 | Eppstein | G06F 9/5072 709/220 |
| 8,359,594 B1 | 1/2013 | Davidson | |
| 8,473,959 B2 | 6/2013 | Box et al. | |
| 8,484,355 B1* | 7/2013 | Lochhead | H04L 41/0806 709/222 |
| 8,555,274 B1* | 10/2013 | Chawla | G06F 9/5077 718/1 |
| 8,799,920 B2 | 8/2014 | Lubsey et al. | |
| 9,027,017 B2 | 5/2015 | Box et al. | |
| 2002/0059427 A1 | 5/2002 | Tamaki | |
| 2002/0161869 A1 | 10/2002 | Griffin et al. | |
| 2002/0184363 A1 | 12/2002 | Viavant et al. | |
| 2003/0028642 A1 | 2/2003 | Agarwal | |
| 2004/0003063 A1 | 1/2004 | Ashok et al. | |
| 2004/0111509 A1 | 6/2004 | Eilam et al. | |
| 2004/0267897 A1 | 12/2004 | Hill | |
| 2005/0039183 A1 | 2/2005 | Romero | |
| 2005/0102674 A1* | 5/2005 | Tameshige | G06F 9/5011 718/100 |
| 2005/0108712 A1 | 5/2005 | Goyal | |
| 2005/0120160 A1 | 6/2005 | Plouffe | |
| 2005/0165925 A1 | 7/2005 | Dan et al. | |
| 2005/0235286 A1 | 10/2005 | Ballew | |
| 2006/0056618 A1 | 3/2006 | Aggarwal | |
| 2006/0069594 A1 | 3/2006 | Yamasaki | |
| 2006/0101224 A1 | 5/2006 | Shah et al. | |
| 2006/0143617 A1 | 6/2006 | Knauerhase | |
| 2006/0161988 A1 | 7/2006 | Costea | |
| 2006/0190605 A1* | 8/2006 | Franz | G06Q 10/0631 709/226 |
| 2006/0190606 A1 | 8/2006 | Kohavi | |
| 2006/0259818 A1 | 11/2006 | Howell | |
| 2007/0106796 A1 | 5/2007 | Kudo et al. | |
| 2007/0106798 A1 | 5/2007 | Masumitsu et al. | |
| 2007/0115924 A1 | 5/2007 | Schneider | |
| 2007/0118567 A1 | 5/2007 | Isokawa | |
| 2007/0250929 A1 | 10/2007 | Herington | |
| 2007/0266433 A1 | 11/2007 | Moore | |
| 2007/0271560 A1 | 11/2007 | Wahlert | |
| 2008/0082977 A1 | 4/2008 | Araujo | |
| 2008/0109549 A1 | 5/2008 | Nakagawa et al. | |
| 2008/0163194 A1 | 7/2008 | Dias et al. | |
| 2008/0163239 A1 | 7/2008 | Sugumar | |
| 2008/0183544 A1 | 7/2008 | Matsumitsu | |
| 2008/0263258 A1 | 10/2008 | Allwell | |
| 2008/0295096 A1 | 11/2008 | Beaty | |
| 2009/0012132 A1 | 1/2009 | Nonomura | |
| 2009/0138887 A1 | 5/2009 | Keitaro et al. | |
| 2009/0199198 A1 | 8/2009 | Horii | |
| 2009/0254572 A1 | 10/2009 | Redlich | |
| 2009/0276771 A1* | 11/2009 | Nickolov | G06F 9/4856 717/177 |
| 2009/0288084 A1* | 11/2009 | Astete | G06F 9/45533 718/1 |
| 2009/0293022 A1 | 11/2009 | Fries | |
| 2010/0107172 A1 | 4/2010 | Calinescu | |
| 2010/0125845 A1 | 5/2010 | Sugumar et al. | |
| 2010/0241751 A1 | 9/2010 | Sonoda et al. | |
| 2010/0242045 A1 | 9/2010 | Swamy | |
| 2011/0093852 A1 | 4/2011 | Wen-Syan et al. | |
| 2011/0099403 A1* | 4/2011 | Miyata | G06F 1/32 713/323 |
| 2011/0119670 A1 | 5/2011 | Sugumar et al. | |
| 2011/0131335 A1 | 6/2011 | Spaltro et al. | |
| 2011/0131589 A1 | 6/2011 | Beaty et al. | |
| 2011/0173637 A1* | 7/2011 | Brandwine | G06F 9/5072 719/314 |
| 2011/0185064 A1 | 7/2011 | Head | |
| 2011/0239215 A1 | 9/2011 | Sugai | |
| 2012/0110328 A1 | 5/2012 | Pate | |
| 2012/0110592 A1 | 5/2012 | Shah et al. | |
| 2012/0174097 A1 | 7/2012 | Levin | |
| 2012/0179824 A1 | 7/2012 | Jackson | |
| 2013/0042087 A1 | 2/2013 | Shah et al. | |
| 2013/0346995 A1* | 12/2013 | Jackson | G06F 21/6218 718/104 |
| 2014/0310710 A1 | 10/2014 | Lubsey et al. | |
| 2016/0234300 A1* | 8/2016 | Khanna | G06F 9/5072 |

FOREIGN PATENT DOCUMENTS

| | | |
|---|---|---|
| EP | 2040176 | 3/2009 |
| WO | WO 2009/012132 | 1/2009 |
| WO | WO 2009/072186 | 6/2009 |

OTHER PUBLICATIONS

Related U.S. Appl. No. 12/709,954.
International Search Report issued in PCT/US2011/025390 dated Jun. 1, 2011.
International Preliminary Report on Patentability and Written Opinion issued in PCT/US2011/025390 dated Aug. 28, 2012.
Related U.S. Appl. No. 12/709,943.
International Search Report issued in PCT/US2011/025393 dated Jun. 2, 2011.
International Preliminary Report on Patentability issued in PCT/US2011/025393 dated Aug. 28, 2012.
Related U.S. Appl. No. 12/709,962.
Related U.S. Appl. No. 13/595,955.
International Search Report issued in PCT/US2012/052561 dated Feb. 7, 2013.
Written Opinion issued in PCT/US2012/052561 dated Feb. 7, 2013.
Chinese Office Action issued in CN 201180020260 dated Sep. 2, 2014.
English Language Translation of Chinese Office Action issued in CN 201180020260 dated Sep. 2, 2014.
Chinese Office Action issued in CN 201180020269.0 dated Oct. 20, 2014.
English Language Translation of Chinese Office Action issued in CN 201180020269.0 dated Oct. 20, 2014.
Chinese Office Action issued in CN 201180020127.4 dated Feb. 15, 2015.
English Language Translation of Chinese Office Action issued in CN 201180020127.4 dated Feb. 15, 2015.
Extended Search Report issued in EP 11745299.5 dated Apr. 1, 2015.
Wei Zheng et al., "JustRunIt: Experiment-Based Management of Virtualized Data Centers", USENIX, May 12, 2009, pp. 1-16.
Josef Spillner et al., "Towards Unified Service Hosting", ICSOFT (2), Jul. 29, 2009, pp. 31-36.
Tim Souder et al., "A Tool for Security Integrating Legacy Systems Into a Distributed Environment", Sixth Working Conference on Reverse Engineering: Proceedings: Oct. 6-8, 1999, Atlanta, Georgia, USA, pp. 47-55.
Extended Search Report issued in EP 11745300.1 dated Mar. 31, 2015.
Ming Zhao, "Experimental Study of Virtual Machine Migration in Support of Reservation of Cluster Resources", Virtualization Technology in Distributed Computing (VTDC), 2007 Second International Workshop on, ACM, Piscatway, NJ, USA, Nov. 12, 2007, pp. 1-8.

(56) References Cited

OTHER PUBLICATIONS

Timothy Wood et al., "Black-box and Grey-box Strategies for Virtual Machine Migration", NSDI '07: 4th USENIX Symposium on Network Systems Design & Implementation, Apr. 1, 2007, pp. 229-242.
Extended Search Report issued in EP 11745297.9 dated Mar. 31, 2015.
Norman Bobroff et al., "Dynamic Placement of Virtual Machines for Managing SLA Violations", 10th IFIP/IEEE International Symposium on Integrated Network Management, 2007. IM '07, May 1, 2007, pp. 119-128.
U.S. Appl. No. 14/318,251.
Chinese Office Action issued in CN 201180020260.X dated May 15, 2015.
English Language Translation for Chinese Office Action issued in CN 201180020260.X dated May 15, 2015.
Chinese Office Action issued in CN 201180020269.0 dated May 7, 2015.
English Language Translation for Chinese Office Action issued in CN 201180020269.0 dated May 7, 2015.
Supplemental European Search Report issued in EP 12826290.4 dated May 7, 2015.
Chinese Office Action issued in CN 201180020260.X dated May 19, 2016.
English Language Translation of Chinese Office Action issued in CN 201180020260.X dated May 19, 2016.
English Language Abstract and Machine Translation of CN 1333508 published on Jan. 30, 2002.
Q. Li et al., "Adaptive Management of Virtualized Resources in Cloud Computing Using Feedback Control," 1st International Conference on Information Science and Engineering, Dec. 2009, pp. 99-102.

\* cited by examiner

200

| User Identifier 210 | Number of Data Center Units 220 | Data Center Units 230 | Virtual Resources 240 | User Preference 250 |
|---|---|---|---|---|
| A | N | $DC_1 \ldots DC_N$ | $AVR_1 \ldots AVR_Q$ | UA |
| B | M | $DC_R \ldots DC_{R+M}$ | $BVR_1 \ldots BVR_S$ | UB |

300

| Availability 310 | Data Center Unit 320 |
|---|---|
| Assigned | U1 |
| Unassigned | U2 |
| Assigned | U3 |
| Unassigned | U4 |
| Unassigned | U5 |

METHODS AND APPARATUS RELATED TO MANAGEMENT OF UNIT-BASED VIRTUAL RESOURCES WITHIN A DATA CENTER ENVIRONMENT

This application is a Continuation of U.S. application Ser. No. 12/709,962 filed Feb. 22, 2010. The entirety of the above-listed application is incorporated herein by reference.

BACKGROUND

Embodiments described herein relate generally to virtual resources within a data center, and, in particular, to management of unit-based virtual resources within a data center environment.

Because data center environments (e.g., cloud computing data center environments) are defined by a relatively large-scale infrastructure, management of the various components within the infrastructure can be complicated and may not be handled in a desirable fashion using known methods and apparatus. In particular, known methods and apparatus for managing resources of infrastructure to provide a specified level service (e.g., a guaranteed level of service) to users with virtual resources operating within the data center environment may not be adequate for some applications. Many of these known methods and apparatus, for example, may be too specialized for some applications and/or may not integrate the diverse functionality of various systems that control and/or manage components within the data center environment to provide a specified level of service in a desirable fashion.

Thus, a need exists for methods and apparatus for management of unit-based virtual resources within a data center environment.

SUMMARY

In one embodiment, a processor-readable medium can be configured to store code representing instructions to be executed by a processor. The code can include code to receive a request to change a value representing a number of data center units included in a set of data center units assigned to a user. Each of the data center units from the set of data center units can be associated with hardware resources managed based on a set of predefined hardware resource limit values. The code can include code to determine, in response to the request, whether hardware resources of a data center unit mutually exclusive from hardware resources of the set of data center units and managed based on the set of predefined resource limit values is available for assignment to the user when the request to change is an increase request.

DETAILED DESCRIPTION

Figure 1:
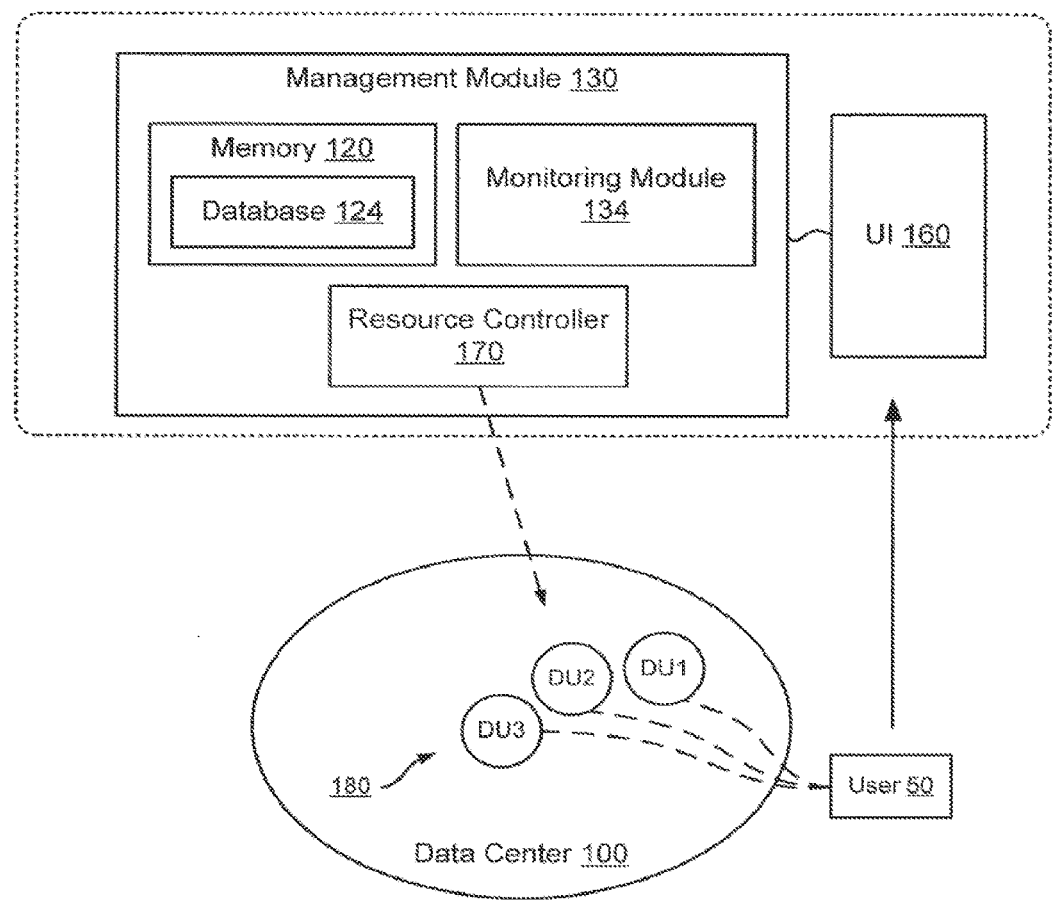
FIG. 1 is a schematic diagram that illustrates a management module, a hardware controller, and a data center, according to an embodiment.

FIG. 1 is a schematic diagram that illustrates a management module 130, a resource controller 170, and a data center 100, according to an embodiment. The management module 130 is configured to send one or more instructions to the resource controller 170 (or a portion thereof) to trigger the resource controller 170 to managed one or more hardware resources of the data center units 180 within the data center 100. As shown in FIG. 1, the data center units 180 include data center unit DU1, data center unit DU2, and data center unit DU3. In some embodiments, the data center units 180 can be referred to as a set of data center units. In some embodiments, the hardware resources of a data center unit can also be referred to as processing resources of a data center unit.

As represented by the dashed lines from the data center units 180 to a user 50, the hardware resources of the data center units 180 are managed (e.g., allocated, provisioned, reserved) for use by the user 50 (e.g., for processing associated with the user 50). Said differently, the data center units 180 (or the data center units of the data center units 180) are assigned to the user 50. Because the data center units 180 are assigned to the user 50, the user 50 can use the hardware resources of data center units 180 to, for example, perform one or more functions specified by the user 50. For example, the hardware resources of data center units 180 can be used by the user 50, for example, to operate one or more virtual resources (e.g., virtual machines) (not shown) of the user 50. In some embodiments, the user 50 can be a customer, a client, a company, and/or so forth. In some embodiments, the user 50 can represent a computing element (e.g., a server, a personal computer, a personal digital assistant (PDA)) associated with, for example, a human user.

The data center units 180 can each be managed as a specified portion of resources (e.g., hardware resources, software resources) of the data center 100. In other words, resources of the data center 100 can be divided into (e.g., partitioned into) data center units 180 that can be used, for example, to handle processing associated with one or more virtual resources (for users such as user 50). In some embodiments, the virtual resource(s) can be configured to, for example, emulate the functionality of a physical source device and/or its associated software.

For example, in some embodiments, the hardware resources (and the associated software resources to support the hardware resources) of one or more of the data center units 180 can be managed so that they perform at (or are capable of performing at), for example, predefined hardware resource limit values. Specifically, the hardware resources of one or more of the data center units 180 can managed so that they perform at, for example, a specified level of network bandwidth (e.g., 10 megabits/second (Mb/s) of network bandwidth, a specified level of network bandwidth of more than 1 Mb/s of network bandwidth), a specified level of processing speed (e.g., a processor speed of 300 megahertz (MHz), a processor speed of 600 MHz, a specific processor speed of more than 200 MHz), a specified input/output (I/O) speed of a storage device (e.g., a disk I/O speed of 40 I/O operations per second, a specified disk I/O speed of more than 10 IOPS), and/or a specified storage device bandwidth (e.g., a disk bandwidth of 10 Mb/s, a specified level of disk bandwidth of more than 10 Mb/s). A specified portion of hardware resources can also be reserved as part of one or more of the data center unit(s) 180. For example, the data center unit(s) 180 can also have a specified level of a storage device (e.g., a disk size of 30 gigabytes (GB), a specified disk size of more than 1 GB) and/or a specified memory space (e.g., a memory storage capacity of 768 megabytes (MB), a specified memory storage capacity of more than 64 MB) allocated to the data center unit(s) 180.

In some embodiments, the hardware resources (and accompanying software) of the data center 100 can be partitioned so that the data center units 180 are guaranteed, if necessary, to perform at, or have hardware resources at, the predefined hardware resource limit values. In other words, the hardware resources of the data center units 180 can be managed so that they provide guaranteed levels of service that correspond with each (or every) predefined hardware resource limit value from a set of predefined hardware resource limit values. Said another way, the hardware resources (or portions thereof) of a data center unit from the data center units 180 can be reserved so that they are available for processing associated with the user 50. For example, a first hardware resource (or a portion thereof) (e.g., a memory component) that defines a first portion of data center unit DU3 can provide a guaranteed level of service that corresponds within a first predefined hardware resource limit value from a set of predefined hardware resource limit values, and a second hardware resource (or a portion thereof) (e.g., a network card) that defines a second portion of data center unit DU3 can provide a guaranteed level of service that corresponds within a second predefined hardware resource limit value from the set of predefined hardware resource limit values.

In some embodiments, if one or more of the hardware resources of the data center units 180 are not performing functions for the user 50 (e.g., performing processing of virtual resources associated with the user 50), the hardware resource(s) (or portions thereof) that are associated with the data center units 180 may be idle (or substantially idle). The hardware resource(s) of the data center units 180 will be idle (or substantially idle) so that they are guaranteed to be available for processing for the user 50 when they are needed. In some embodiments, a guaranteed level of service can also be referred to as a guaranteed level of functionality.

In some embodiments, the set of predefined hardware resource limit values (which can be used to define the data center units 180) can be defined based on statistical data based on a predefined set of virtual resources that indicates a particular combination of hardware resources can be used to operate a virtual resource. In some embodiments, for example, a set of predefined hardware resource limit values can be defined based on empirical data. Specifically, a hardware resource limit value associated with a particular hardware type (e.g., a disk type) can first be selected. Additional hardware resource limit values associated with other hardware types can be defined based on empirical data related to desirable operation of the additional hardware resources when the particular hardware type is operating at the selected hardware resource limit value. Accordingly, the set of predefined hardware resource limits values can be defined based on the collective performance of the hardware resources using the selected hardware resource limit value as a starting point. In some embodiments, the data center units 180 can be defined by a set of predefined hardware resource limit values so that the data center unit can operate a particular type of virtual resource or set of virtual resources in a desirable fashion (within a particular set of performance specifications).

The hardware resources of the data center units 180 can be managed (e.g., allocated, reserved), at least in part, by the resource controller 170 (or a portion thereof) based on one or more predefined hardware resource limit values. For example, the resource controller 170 can be configured to manage a resource (e.g., a software resource, a hardware resource) of the data center 100, or a portion thereof, to one or more of the data center units 180 based on a predefined hardware resource limit value (e.g., a predefined hardware resource limit value from a set of predefined hardware resource limit values). In other words, the predefined hardware resource limit values can be policed or enforced by the resource controller 170. For example, the resource controller 170 can be configured to manage processing resources of a processor of a host device (not shown) within the data center 100 so that a specified portion of the processing capacity of the processor (which can correspond with a hardware resource limit value) is reserved for the data center unit DU1. The resource controller 170 (or a portion thereof) can be configured to interface with the resources of the data center 100 so that the hardware resources (from the resources of the data center 100) of data center units 180 can provide guaranteed levels of service that correspond with a set of predefined hardware resource limit values. In some embodiments, the resource controller 170 can include one or more specialized resource controllers that are each configured to manage resources associated with a particular type of resource (e.g., a memory type, a central processing unit). More details related to a resource controller and specialized resource controllers are described in connection with FIG. 5.

In some embodiments, the hardware resources of one or more of the data center units 180 can be managed so that only certain predefined hardware resource limit values of the hardware resources of the data center unit(s) 180 are guaranteed. In some embodiments, for example, the hardware resources of data center unit DU1 can be managed by the resource controller 170 (or a portion thereof) so that the hardware resources of data center unit DU1 can provide a guaranteed level of processing speed and have a guaranteed portion of disk space available, but can be managed so that the hardware resources of data center unit DU1 may provide a specified bandwidth speed in only certain situations. Accordingly, the bandwidth speed of the hardware resources of data center unit DU1 is not guaranteed. In such circumstances, the data center unit DU1 can be referred to as a partially guaranteed data center unit.

In some embodiments, the hardware resources of data center units 180 can be managed so that the hardware resources of each of the data center units 180 is managed based on the same set of hardware resource limit values. Accordingly, hardware resources of each data center unit from the data center units 180 may be managed so that they provide the same (or substantially the same) guaranteed level of service.

In some embodiments, the hardware resources of one or more of the data center units 180 can be based on different sets of predefined hardware resource limit values. For example, the hardware resources of data center unit DU1 can be based on a first set of predefined hardware resource limit values and the hardware resources of data center unit DU2 can be based on a second set of predefined hardware resource limit values different than the first set of predefined hardware resource limit values. In such instances, the hardware resources of data center unit DU1 can provide a different guaranteed level of service than the guaranteed level of service provided by hardware resources of data center unit DU2. The resource controller 170 can be configured to manage the hardware resources of these different data center units based on the different sets of predefined hardware resource limit values.

In some embodiments, one or more of the data center units 180 can include software resources. In other words, software resources can be associated with (and can define) at least a portion of the data center unit(s) 180. For example, the hardware resources of data center unit DU1 can have a software resource licensed specifically for operation of and/or operation within the hardware resources of data center unit DU1. In some embodiments, the resource controller 170 (or a portion thereof) can be configured to manage the software resources of the data center 100 so that the software resources are allocated (e.g., assigned), as specified, to the hardware resources of each of the data center units 180.

Resource controllers configured to manage a portion of a data center unit that is hardware-based can be referred to as hardware resource controllers. For example, a data center unit that includes specified allotment of memory can be defined by a hardware controller. Similarly, resource controllers configured to manage a portion of a data center unit that is software-based can be referred to as software resource controllers. Software resources and hardware resources of a data center unit can be collectively referred to as processing resources. Accordingly, the processing resources of a data center unit can be managed by (e.g., collectively managed by) a resource controller.

As shown in FIG. 1, the management module 130 can be in communication with (e.g., can be accessed via) a user interface (UI) 160. The user interface 160 can be configured so that a user (e.g., a data center administrator, a network administrator, a customer, a source owner) can send signals (e.g., control signals, input signals, signals related to instructions) to the management module 130 and/or receive signals (e.g., output signals) from the management module 130. Specifically, the user interface 160 can be configured so that the user can trigger one or more functions to be performed (e.g., executed) at the management module 130 via the user interface 160 and/or receive an output signal from the management module 130 at, for example, a display (not shown) of the user interface 160. For example, in some embodiments, a user can manage at least a portion of the database 124 via the user interface 160. In some embodiments, the user interface 160 can be a graphical user interface (GUI).

As shown in FIG. 1, an integer number of data center units 180 (which can each have hardware resources managed based on the same set of predefined hardware resource limit values) are assigned to (e.g., reserved for use by) the user 50. A request for a specified number or a change in a number of the data center units, such as the data center units 180 shown in FIG. 1, can be received at the management module 130. In some embodiments, the request can be defined in response to an input from the user 50. In other words, the user can make a request for a specified number of data center units via the user interface 160.

A value representing the number of data center units can be stored in a database 124 within a memory 120 of the management module 130. Each number can represent the hardware resources collectively managed as a data center unit. In some embodiments, the value can be associated with an identifier representing the user 50. An example of a database storing information related to data center units assigned to a user is shown in FIG. 2.

Figures 2, 3, 4:
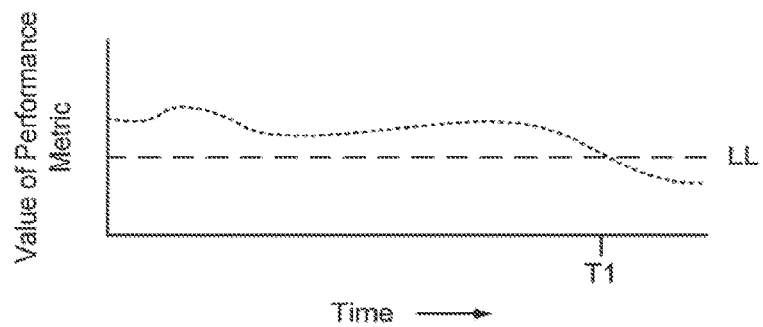
FIG. 2 is a schematic diagram that illustrates a database that can be stored in a memory of a management module, according to an embodiment.
FIG. 3 is a schematic diagram that illustrates a database that includes information about the availability of data center resources, according to an embodiment.
FIG. 4 is a graph that illustrates values of a performance metric, according to an embodiment.

FIG. 2 is a schematic diagram that illustrates a database 200 that can be stored in a memory of a management module, according to an embodiment. The database 200 can be stored in a memory such as the memory 120 of the management module 130 shown in FIG. 1. As shown in FIG. 2, data center units $DC_1$ through $DC_N$ (shown in the column labeled data center units 230) are assigned to a user represented by the user identifier "A" (shown in the column labeled user identifier 210), and data center units $DC_R$ through $DC_{R+M}$ (shown in the column labeled data center units 230) are assigned to a user represented by user identifier "B" (shown in the column labeled user identifier 210). The number of data center units (column 220) assigned to user A is represented by the value N, and the number of data center units (column 220) assigned to user B is represented by the value M. In some embodiments, the values "N" and "M" can be integer numbers.

As shown in FIG. 2, virtual resources $AVR_1$ through $AVR_Q$ (shown in the column labeled virtual resources 240) are associated with user A, and virtual resources $BVR_1$ through $BVR_S$ (shown in the column labeled virtual resources 240) are associated with user B. Although not shown in FIG. 2, the database 200 can also be defined to represent which of the data center resources of the data center units are operating each of the virtual resources. For example, although not shown, the database 200 can be configured to store information representing that data center resources defining data center unit $DC_2$ are operating virtual resources $AVR_4$ through $AVR_Q$. In some embodiments, the virtual resources 240 can be configured to emulate one or more functions of, for example, a legacy source device being migrated to the virtual resources 240. More details related to migration of a source to a data center to be emulated as one or more virtual resource are described in U.S. patent application Ser. No. 12/709,954, filed on Feb. 22, 2010, entitled, "Methods and Apparatus Related to Migration of Customer Resources to Virtual Resources within a Data Center Environment," and U.S. patent application Ser. No. 12/709,943, filed on Feb. 22, 2010, entitled, "Methods and Apparatus for Movement of Virtual Resources within a Data Center Environment," which are both incorporated herein by reference in their entireties.

In some embodiments, the database 200 can be dynamically updated to represent changes in resources (e.g., software resources, hardware resources) such as a decrease or increase in a number of data center resources assigned to one or more of the users. Specifically, values representing the number of data center units 220 assigned to a user represented by the user identifiers 210 can be dynamically modified.

Referring back to FIG. 1, in some embodiments, the user 50 can request, via the user interface 160, an increase in a number of data center units (such as data center units 180) assigned to the user 50. Accordingly, a request to change a value representing the number of data center units assigned to the user 50 can be received at the management module 130. The value can be stored at the memory 120 of the management module 130. A request to increase a number of data center units can be referred to as an increase request. The request can be received at the management module 130 from the user interface 160.

In response to an increase request, the management module 130 can be configured to determine whether or not resources of the data center 100 are available to be assigned to the user 50 as resources of a data center unit. In some embodiments, the management module 130 can be configured to store inventory information representing resources available at the data center 100 in the memory 120, for example, in database 124. In such embodiments, the management module 130 can be configured to access the inventory information and determine, based on the inventory information, whether one or more data center units, or hardware resources of one or more data center units, (not shown) are available to be assigned to a user such as user 50. In some embodiments, inventory information representing an unassigned pool of resources and/or data center units (or hardware of data center units) can be stored in the memory 120. An example of inventory information that can be stored in the database 124 of the memory 120 is shown in FIG. 3.

FIG. 3 is a schematic diagram that illustrates a database 300 that includes information about the availability of data center resources, according to an embodiment. As shown in FIG. 3, the data center units (or hardware resources of data center units) represented by identifiers U1 and U3 (shown in column 320) are not available for assignment to a user because, as indicated in column 310, these data center units are already assigned to a user. The data center units represented by identifiers U2, U4, and U5 (shown in column 320) are available for assignment to a user because, as indicated in column 310, these data center units not assigned to a user. In some embodiments, the data center units represented by identifiers U2, U4, and U5, because they are not assigned, can be referred to as a pool of unassigned data center resources, or as a pool of unassigned data center units.

Although not shown, in some embodiments, a database can be configured to store inventory information related to individual hardware resources (e.g., processor, network interface cards, storage devices) that can be managed as a data center unit. Specifically, the availability or unavailability of the individual hardware resources (or portions thereof) can be stored in the database. Based on this inventory information about the hardware resources (or portions of the hardware resources), a management module (such as management module 130 shown in FIG. 1) can determine whether or not hardware resources may be available to define a data center unit that can be assigned to a user.

Referring back to FIG. 1, if a data center unit (not shown) is available for assignment to user 50 (or if hardware resources of the data center 100 are available to be managed as a data center unit that can be assigned to user 50), the management module 130 can be configured to assign the available data center unit to user 50 so that the hardware resources of the data center unit can be used by, for example, a virtual resource associated with the user 50. In other words, if a sufficient number of data center units are available to satisfy the increase request, the management module 130 can grant the request and assign the data center unit(s) to the user 50. The data center units that are assigned to the user 50 can be removed from, for example, a pool of unassigned resources (or data center units). In some embodiments, one or more data center units that are assigned to a user in response to an increase request can have a status associated with the data center unit(s) changed from an available status to an unavailable status. In some embodiments, the availability or unavailability of a data center unit (or hardware resources that can be used to define a data center unit) can be determined based on inventory information stored in the memory 120.

In some embodiments, the user 50 can request, via the user interface 160, a decrease in a number of data center units (such as data center units 180) assigned to the user 50. Accordingly, a request to change a value representing the number of data center units (which can represented hardware resources collectively managed as a data center unit) assigned to the user 50 can be received at the management module 130. A request to decrease a number of data center units can be referred to as an decrease request. The request can be received at the management module 130 from the user interface 160.

In some embodiments, hardware resources of a data center unit removed from a set of data center units previously assigned to a user can be reassigned to another user. For example, if hardware resources managed as a data center unit DU2 are removed from the set of data center units 180 in response to a decrease request from the user 50, the hardware resources managed as data center unit DU2 can be assigned to another user (not shown). The reassignment can be represented in a database 124 stored in the memory 120. In some embodiments, the data center unit DU2 (e.g., the hardware resources of the data center unit DU2) can be returned to a pool of unassigned data center units.

In some embodiments, the memory 120 can be, for example, a random-access memory (RAM) (e.g., a dynamic RAM, a static RAM), a flash memory, a removable memory, and/or so forth. In some embodiments, the database 124 can be implemented as, for example, a relational database, an indexed database, a table, and/or so forth. Although the memory 120 and the database 124 are shown as being local to the management module 130, in some embodiments, one or more portions of the database 124 can be stored in a remote memory that can be accessed by the management module 130. For example, the portions of the database 124 can be stored in a separate (e.g., a remote) storage device (e.g., storage facility) that can be accessed by the management module 130 via a network (e.g., a local area network (LAN), a wide area network (WAN)) (not shown).

As shown in FIG. 1, the management module 130 can include a monitoring module 134. The monitoring module 134 can be configured to trigger a change in a number of data center units (such as data center units 180) assigned to a user (such as user 50) based on one or more values representing performance associated with the hardware resources of data center units. The values representing performance can be referred to as performance metric values. In some embodiments, the monitoring module 134 can be configured to trigger an increase or a decrease in a number of data center units assigned to user 50 in response to a threshold condition being satisfied based on one or more performance metric values.

For example, the monitoring module 134 can be configured to remove data center unit DU2 from the set of data center units 180 assigned to user 50 in response to a performance metric value indicating that the data center units 180 collectively are being under-utilized. In some embodiments, the monitoring module 134 can be configured to add an additional data center unit (not shown) (or hardware resources of the additional data center unit) to the set of data center units 180 assigned to user 50 in response to a performance metric value indicating that the hardware resources of data center units 180 collectively are being over-utilized. The over-utilization can be manifested in, for example, failure data. In some embodiments, the monitoring module 134 can be configured to replace one or more data center units (such as data center units 180) assigned to a user (such as user 50) based on a threshold condition being satisfied based on a performance metric value. In some embodiments, the monitoring module 134 can be configured to modify a number of data center assigned to a user by modifying a value stored in a database (such as database 124) that represents a number of data center units.

FIG. 4 is a graph that illustrates values of a performance metric, according to an embodiment. As shown in FIG. 4, the values of the performance metric (shown on the y-axis) are plotted versus time (shown on the x-axis). The values of the performance metric are above a lower limit value (shown as "LL") before time T1, and the values of the performance metric are below the lower limit value after time T1. A monitoring module, such as monitoring module 134 shown in FIG. 1, can be configured to modify a number of data center units assigned to a user in response to the values of the performance metric falling below the lower limit value at time T1. In other words, the monitoring module can modify the number of data center units assigned to the user in response to the values of the performance metric satisfying a threshold condition associated with the lower limit value at time T1.

Referring back to FIG. 1, the monitoring module 134 can be configured to modify a number of data center units assigned to a user (such as user 50) based on various performance metric values, such as, for example, a capacity value, a value representing a failure rate, a utilization value, and/or so forth. In some embodiments, the performance metric values can be associated with a specified period of time.

In some embodiments, the monitoring module 134 can be configured to receive the values (e.g., pushed values, pulled values) representing the performance metric from the data center 100 (or a portion thereof). For example, in some embodiments, the monitoring module 134 can be configured to receive one or more performance metric values produced by virtual resources operating within the hardware resources of data center units of the data center 100. In some embodiments, the performance metric values can be received periodically, randomly, in a preselected manner, and/or in response to a request from the monitoring module 134. In some embodiments, the monitoring module 134 can be configured to request and receive data from one or more resources (e.g., hardware resources, software resources, virtual resources) of the data center 100 that can be used to calculate a performance metric value.

In some embodiments, the monitoring module 134 can be configured to send a notification to, for example, the user 50 via user interface 160, indicating that a number of data center units assigned to the user 50 should be modified. In some embodiments, the monitoring module 134 can be configured to modify a number of data center units (by modifying a value representing the number of data center units) assigned to the user 50 only when authorized to do so by the user. In some embodiments, the monitoring module 134 can be configured to solicit authorization from the user 50 via the user interface 160 for modification of the number of the data center units 180. When authorization is received from the user 50 via the user interface 160 the monitoring module 134 can be configured to modify the number of data center units 180 assigned to the user 50.

In some embodiments, the management module 130 can be configured to identify a minimum number of data center units (such as data center units 180) to operate a virtual resource. For example, the management module 130 can be configured to identify (or calculate) a minimum number of data center units (based on one or more assessment parameter values) to operate a virtual resource within a data center environment. In some embodiments, the management module 130 can be configured to determine that a particular minimum number of data center units are used to operate a virtual resource emulating, for example, at least a portion of a particular physical device. In some embodiments, the number of discrete data center units selected to operate a virtual resource (or set of virtual resources) can be determined by the management module 130 based on, for example, an ability of the data center units to handle burst processing levels of the virtual resource(s) and/or an average processing level of the virtual resource(s). In some embodiments, the calculations related to numbers of data center units to operate a virtual resource can be performed by an assessment module portion (not shown) of the management module 130. More details related to an assessment module are described in connection with U.S. patent application Ser. No. 12/709,954, filed on Feb. 22, 2010, entitled, "Methods and Apparatus Related to Migration of Customer Resources to Virtual Resources within a Data Center Environment," which has been incorporated herein by reference in its entirety.

In some embodiments, the monitoring module 134 can be configured to modify a number of data center units assigned to the user 50 based on a user preference of the user 50. In some embodiments, the user preference can identify the performance metric values to be used by the monitoring module 134 to modify a number of data center units (such as data center units 180 shown in FIG. 1) assigned to a user. In some embodiments, the user preference can identify one or more threshold conditions to be used the monitoring module 134 to modify a number of data center units assigned to the user 50. In some embodiments, one or more user preferences can be stored in memory 120.

As shown in FIG. 2, a user preference UA (shown in column 250) is associated with the user represented by user identifier A (shown in column 210), and a user preference UB (shown in column 250) is associated with the user represented by user identifier B (shown in column 210). The user preference UA and UB can represent user preferences related to monitoring of data center units (which are shown in column 230). In some embodiments, the monitoring module 134 can be configured to access the user preferences 250 and can be configured modify the number of data center units (shown in column 220) based on the user preferences 250.

In some embodiments, one or more portions of the management module 130 can be (or can include) a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). Although not shown, in some embodiments, the management module 130 can include one or more memory portions (e.g., a random access memory (RAM) portion, a shift register, a cache) that can be used during operation of one or more functions of the management module 130. In some embodiments, one or more of the functions associated with the management module 130 can be included in different modules and/or combined into one or more modules.

Although not shown, in some embodiments, the hardware resources and/or software resources of the data center 100 can include one or more levels of infrastructure. For example, in some embodiments, the hardware resources of the data center 100 can include, host devices (e.g., server devices), storage devices, access switches, aggregation devices, routers, interface components, cables, and/or so forth. For example, the data center 100 can be configured so that host devices (which can be configured to host virtual resources) and/or storage devices can be in communication with (e.g., coupled to) a layer of access switches that are in communication with (e.g., coupled to) a layer of aggregation devices. The aggregation devices can function as gateway devices into a set of routers/switches that function as core switching elements of the data center 100.

In some embodiments, the software resources of the data center 100 can include, for example, management modules, operating systems, hypervisors (e.g., VMware hypervisor, Xen hypervisor, Hyper-V hypervisor), and/or so forth. In some embodiments, the data center 100 can be a cloud computing environment where hardware resources and/or software resources are shared by multiple virtual resources associated with one or more users (e.g., clients, customers). In some embodiments, the virtualized environment defined by the data center 100 can be referred to as a data center virtualized environment. In some embodiments, the software resources of the data center 100 can include, for example, management modules, operating systems, hypervisors, and/or so forth. The hypervisors can be configured to facilitate virtualization of hardware resources of host devices. The operating systems can be installed at routers, aggregation devices, routers, core switching elements, and/or so forth.

In some embodiments, the management module 130 can be a centralized management module configured to handle data center management for the entire data center 100, or can be a de-centralized management module configured to handle management of only a portion of the data center 100. In some embodiments, the management module 130 can be configured to perform various functions in addition to management of data center units such as data center units 180. For example, the management module 130 can be configured to handle disaster recovery, migration of virtual resources to a data center, and/or so forth. More details related to a management module configured to perform various operations related to a data center environment are set forth in U.S. Provisional Patent Application Ser. No. 61/306,752, filed on Feb. 22, 2010, entitled, "Methods and Apparatus for Data Center Management Independent of Hypervisor Platform," which is incorporated herein by reference in its entirety.

In some embodiments, the data center 100 can be managed locally or can have consolidated management. For example, the entire data center 100, or a portion thereof, can be managed via a single management module (not shown). In some embodiments, the entire data center 120, or a portion thereof, can be managed via multiple management modules (not shown) that can be distributed through the data center 100 infrastructure. In some embodiments, some functionality of the data center 100 can be managed based on a consolidated management scheme, while other functionality of the data center 100 can be managed based on a distributed management scheme.

Figure 5:
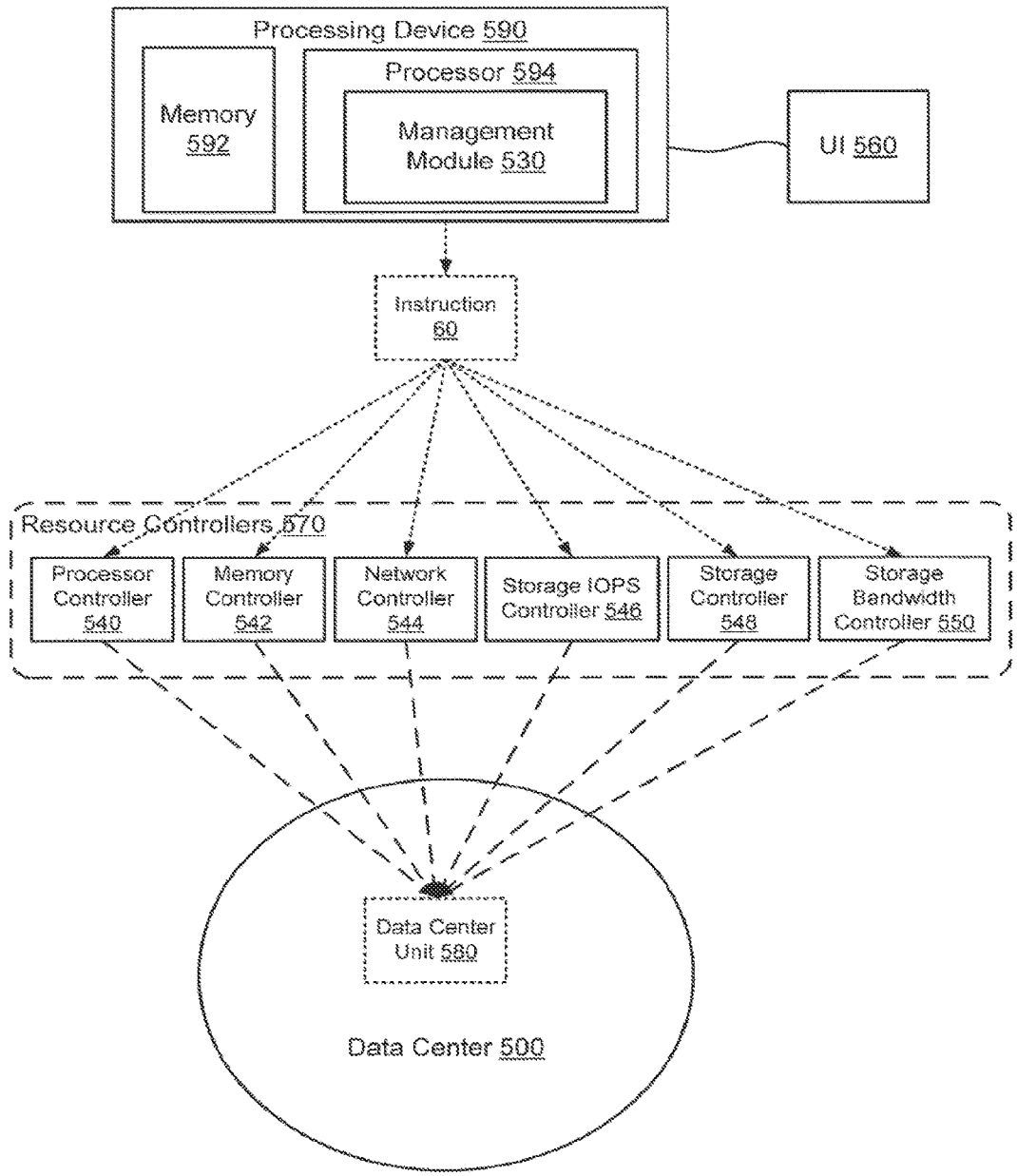
FIG. 5 is a schematic diagram that illustrates resources controller in communication with a data center, according to embodiment.

FIG. 5 is a schematic diagram that illustrates resources controllers 570 in communication with a data center 500, according to embodiment. As shown in FIG. 5, the resource controllers 570 include a processor (e.g., a central processing unit (CPU)) controller 540, a memory controller 542, a network controller 544, a storage input/output operations per second (IOPS) controller 546, a storage controller 548, and a storage bandwidth controller 550. In some embodiments, the resources controllers 570 can include, for example, a VMware capacity planning tool, a VMware vSphere controller, a Converged Network Adapter controller, a Compellent SAN controller, and/or so forth.

Each of the resource controllers 570 shown in FIG. 5 are configured to manage resources associated with a particular type of hardware of a data center 500. As represented in FIG. 5, the resource controllers 570 can be configured to manage a portion of the data center unit 580. Accordingly, the resource controllers 570 collectively manage the hardware resources of data center unit 580. One or more of the resource controllers 570 shown in FIG. 5 can be included in the resource controller 170 shown in FIG. 1.

In some embodiments, the processor controller 540 can be configured to manage the resources of one or more processors (not shown) of the data center 500 so that a certain portion of the computing cycles of the processor(s) are reserved for the data center unit 580. In other words, the computing cycles can be reserved so that if the computing cycles are needed by a virtual resource of a user to whom the data center unit 580 is assigned, the computing cycles will be available for use by the virtual resource of the user. For example, in some embodiments, computing cycles substantially equivalent to, for example, a 100 MHz processor, a 1.5 GHz processor, or so forth, can be reserved for the data center unit 580. In some embodiments, a hardware resource limit value specific to the processor controller 540 can be referred to as a processor limit value.

In some embodiments, the memory controller 542 can be configured to manage the resources of one or more memory components (not shown) of the data center 500 so that a certain portion of the memory component(s) can be reserved for the data center unit 580. For example, in some embodiments, a memory storage capacity of 1 MB, 10 MB, or so forth, of a memory component can be reserved for the data center unit 580. In some embodiments, a hardware resource limit value specific to the memory controller 542 can be referred to as a memory limit value.

In some embodiments, the network controller 544 can be configured to manage the resources of one or more network components (e.g., network interface cards) (not shown) of the data center 500 so that a certain portion of processing power of the network component(s) can be managed (e.g., reserved) as part of the data center unit 580. For example, in some embodiments, a data transfer capacity of a network component can be time-division multiplexed so that a specified level of network bandwidth substantially equal to, for example, 5 Mb/s, 100 Mb/s, 1 Gb/s, or so forth, can be managed for the data center unit 580. In some embodiments, a hardware resource limit value specific to the network controller 544 can be referred to as a network limit value.

In some embodiments, a storage IOPS controller 546 can be configured to manage the resources of one or more storage components (e.g., hard disk drive, server storage) (not shown) of the data center 500 so that a certain IO capacity of the storage component (e.g., more than 1 IOPS, 50 IOPS) can be managed for (e.g., reserved for) the data center unit 580. In some embodiments, a hardware resource limit value specific to the storage IOPS controller 546 can be referred to as an IOPS limit value.

In some embodiments, a storage controller 548 can be configured to manage the resources of one or more storage components so that a certain portion of storage capacity of the storage component(s) (e.g., 50 GB, 100 GB, 10 Terabytes (TB)) can be reserved for the data center unit 580. In some embodiments, a hardware resource limit value specific to the storage controller 548 can be referred to as a storage limit value.

In some embodiments, a storage bandwidth controller 550 can be configured to manage the bandwidth of one or more storage components so that a certain portion of the bandwidth (e.g., 10 Mb/s, 1 Gb/s) can be managed (e.g., reserved) for the data center unit 580. In some embodiments, a hardware resource limit value specific to the storage bandwidth controller 542 can be referred to as a storage bandwidth limit value.

The resource controllers 570 can be triggered to reserve a specified portion of hardware resources of the data center 500 for the data center unit 580 based on one or more hardware resource limit values. The hardware resource limit values can be communicated to the resource controllers 570 in an instruction 60. In some embodiments, the instruction 60 can be defined in response to a request (e.g., an increase request, a decrease request) received at the management module 530 from the user interface (UI) 560. As shown in FIG. 5, the management module 530 can be executed within a processor 594 of a processing device 590. The processing device 590 can also include a memory 592 (e.g., a storage device, a buffer, a RAM) configured to facilitate the functions of, for example, the management module 530. For example, the memory 592 can be used by the management module 530 during communication with the resource controllers 570.

As shown in FIG. 5, the instruction 60 can be sent to each of the resource controllers. The instruction 60 can include hardware resource limit values for each of the resource controllers within the resource controller 570. For example, with respect to the memory controller 542, the instruction 60, which can include hardware resource limit values specific to each of the resource controllers within the resource controller 570, can be defined at the management module 530 and sent to the memory controller 542. The memory controller 542 can be configured to parse a hardware resource limit value specific to the memory controller 542 from the instruction 60. The memory controller 542 can be configured to manage hardware resources of the data center 500 for use as the data center unit 580 based on the hardware resource limit value.

Although not shown, in some embodiments, the management module 530 can be configured to define and send two or more different instructions to each of the resource controllers within the resource controllers 570. The different instructions can be sent to the resource controllers 570 because some of the resource controllers can be configured to operate based on different platforms (e.g., hardware and/or software platforms, protocols) than other resource controllers from the resource controller 570. For example, the management module 530 can be configured to send a first instruction (which includes a network limit value) based on a first application programming interface (API) to the network controller 544, and send a second instruction (which includes a storage limit value) based on a second API to the storage controller 548.

Although six different types of resource controllers are shown in the resource controllers 570, in some embodiments, a different combination of resource controllers can be used to manage the hardware resources of data center unit 580. For example, less than all of the resource controllers 570 shown in FIG. 5 can be used to manage the hardware resources of data center unit 580. In some embodiments, a different resource controller such as a bus speed resource controller can be used to manage a bus portion of the data center unit 580. In some embodiments, the instruction 60 (or set of instructions) can be configured to trigger all or a portion of the resource controllers 570 to manage the hardware resources of the data center unit 580 in a customized fashion.

Although shown as being separate from the management module 530 in FIG. 5, in some embodiments, one or more of the resource controllers 570 can be integrated into the management module 530. In some embodiments, one or more functions of the resource controllers 570 can be included as a function of the management module 530. Although not shown, in some embodiments, the resource controllers 570 can include a software resource controller.

Figure 6:
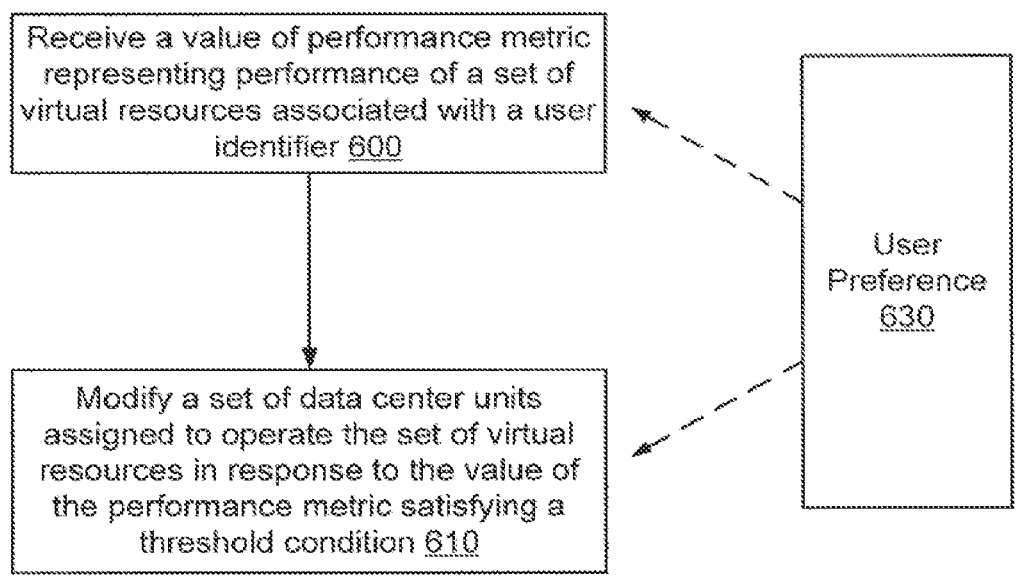
FIG. 6 is a flowchart that illustrates a method for modifying a set of data center units based on a performance metric, according to an embodiment.

FIG. 6 is a flowchart that illustrates a method for modifying a set of data center units based on a performance metric, according to an embodiment. As shown in FIG. 6, a value of a performance metric representing performance of a set of virtual resources associated with a user identifier is received, at 600. The set of virtual resources can be associated with a user (based on a user identifier representing the user). In some embodiments, the performance metric can be, for example, related to a failure rate of the virtual resources. In some embodiments, the performance metric can be optionally specified in a user preference 630 associated with the user, or can be based on a default value.

A set of data center units assigned to operate the set of virtual resources is modified in response to the performance metric satisfying a threshold condition, at 610. In some embodiments, a number of data center units mapped to the set of virtual resources can be increased or decreased. In some embodiments, the threshold condition can be optionally defined within the user preference 630 associated with a user, or can be based on a default value.

Figure 7:
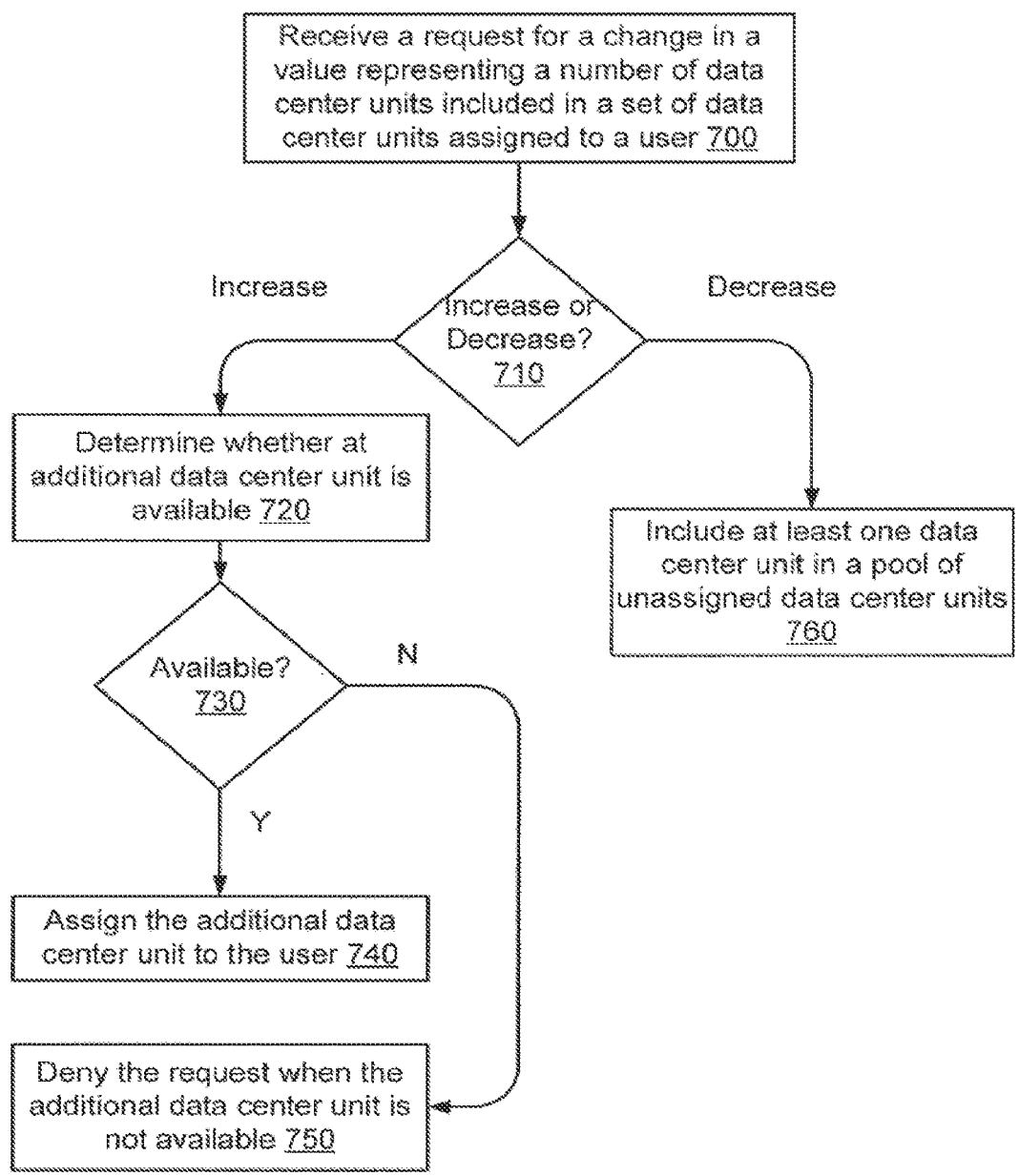
FIG. 7 is a flowchart that illustrates a method for modifying a number of data center units in response to a request, according to an embodiment.

FIG. 7 is a flowchart that illustrates a method for modifying a number of data center units in response to a request, according to an embodiment. Each number can represent hardware resources collectively managed as a data center unit. As shown in FIG. 7, a request for a change in a value representing a number of data center units included in a set of data center units assigned to a user is received, at 700. The request can be triggered by the user and can be received at a management module from a user interface. In some embodiments, the number of data center units assigned to the user can be represented by a value in a database stored in a memory.

If the request is an increase request, at 710, the availability of an additional data center unit is determined, at 720. The availability can be determined based on information about a pool of unassigned data center units stored in a database. As shown in FIG. 7, the additional data center unit is assigned to the user, at 740, when the data center unit is available, at 730.

When the additional data center units are not available, at 730, the request is denied, at 750. In some embodiments, the additional data center units may not be available because they are assigned to another user, or because resources (e.g., hardware resources, software resources) managed as a data center unit are not available. In some embodiments, the request may not be denied, but can instead be assigned a pending state (e.g., a held state) until resources (e.g., hardware resources, software resources) that can be assigned to the user become available. In other words, the request can be pending until resources that can be managed as a data center unit (and can be assigned to the user) become available. In some embodiments, the request can be queued with other requests in a request queue. In some embodiments, a queue of requests can be handled in a first-in-first-out (FIFO) fashion, or in some other order.

If the request is a decrease request, at 710, at least one data center unit is included in a pool of unassigned data center units, at 750. An assignment of the data center unit(s) can be modified so that they are no longer assigned to the user and instead included in a pool of unassigned data center units. In other words, a representation of the data center unit(s) are included in a pool of unassigned data center units so that, for example, a management module can identify these data center unit(s) as not being assigned to a user. Although not shown, in some embodiments, a management module, for example, can be configured to reassign one or more of the data center units to another user rather than include the data center unit(s) in the pool of unassigned data center units.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using, for example, a run-time environment and/or an application framework such as a Microsoft .NET framework and/or Java, C++, or other programming languages (e.g., object-oriented programming languages) and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, multiple management modules can be configured to cooperatively handle assignment of data center units to one or more users.

What is claimed is:

1. A method for managing virtual resources, the method comprising:

managing virtual resources within a data center environment, the data center environment including a plurality of data center units, each data center unit including a grouping of different types of hardware resources which collectively meet predefined hardware resource limit values associated with one or more service levels, the managing using a database configured to keep track of and manage resources by processing the virtual resources as a function of the predefined hardware resource limit values for the service levels, the database configured with fields for user identifier information, quantity of data center units associated with each service level assigned to each user, unit-based listings of data center units assigned to each user, virtual resource information regarding virtual resources associated with each user, and user preference information;

processing a user-generated request to change a value representing a number of data center units associated with a given service level included in a set of data center units currently assigned to a user, determining, in response to the request, whether hardware resources of at least one data center unit associated with the given service level mutually exclusive from hardware resources of the set of data center units currently assigned to the user are available for assignment to the user when the request to change is an increase request;

adding said at least one data center unit to the set of data center units assigned to the user when the request to change is an increase request and when the determination determines that the hardware resources of said at least one data center unit are available for assignment to the user; and modifying the set of data center units when the request to change is a decrease request;

wherein the user-generated request is generated automatically in response to identifying that a current performance of the set of data center units currently assigned to the user meets one or more threshold conditions for one or more performance metrics specified in the user preference information for the user stored in the database;

wherein modifying the set of data center units comprises modifying a distribution of a set of virtual resources operating within the set of data center units when the request to change is a decrease request such that the set of virtual resources operate within a first subset of the set of data center units before modifying the set of data center units and operate within a second subset of the set of data center units different from the first subset of the set of data center units after modifying the set of data center units; and wherein a given one of the virtual resources is managed by allocating two or more of data center units for operating the given virtual resource to emulate functionality of at least one of a physical device and software associated with the physical device.

2. The method of claim 1, wherein two or more of the data center units currently assigned to the user are configured to operate respective sets of virtual resources at two or more different service levels.

3. The method of claim 1, wherein the modifying comprises:

removing at least one data center unit from the set of data center units currently assigned to the user when the request to change is a decrease request.

4. The method of claim 1, wherein the modifying comprises:

identifying a given data center unit for removal from the set of data center units when the request to change is a decrease request; and associating the given data center unit with a pool of unassigned data center units.

5. The method of claim 1, wherein the user is a first user, and wherein the modifying comprises:

reassigning at least one data center unit from the set of data center units currently assigned to the first user to another set of data center units currently assigned a second user when the request to change is a decrease request.

6. The method of claim 1, further comprising:
sending a notification that the request to change has been denied when the hardware resources are unavailable for assignment to the user.

7. The method of claim 1, wherein the set of predefined hardware resource limit values includes:
at least one of a processor speed limit value, a memory space limit value, or a network bandwidth limit value; and
at least one of a disk space limit value, a disk bandwidth limit value, or a disk input/output limit value.

8. An apparatus, comprising:
a memory configured to store information representing assignment of a set of data center units to a user identifier, and
a management circuit configured to:
manage virtual resources within a data center environment, the data center environment including a plurality of data center units, each data center unit including a grouping of different types of hardware resources which collectively meet predefined hardware resource limit values associated with one or more service levels, the managing using a database configured to keep track of and manage resources by processing the virtual resources as a function of the predefined hardware resource limit values for the service levels, the database configured with fields for user identifier information, quantity of data center units associated with each service level assigned to each user, unit-based listings of data center units assigned to each user, virtual resource information regarding virtual resources associated with each user, and user preference information; and
modify a value representing a number of data center units associated with a given service level included in the set of data center units currently assigned to a user in response a user-generated request associated with the user identifier, wherein the modifying effects a change in the number of data center units associated with the given service level included in the set of data center units, the modifying including:
adding at least one data center unit associated with the given service level when the user-generated request is an increase request, said at least one data center unit comprising a data center unit associated with the given service level mutually exclusive from hardware resources of the set of data center units currently assigned to the user; and
modifying the set of data center units when the request is a decrease request;
wherein the user-generated request is generated automatically in response to identifying that a current performance of the set of data center units currently assigned to the user meets one or more threshold conditions for one or more performance metrics specified in the user preference information for the user stored in the database;
wherein modifying the set of data center units comprises modifying a distribution of a set of virtual resources operating within the set of data center units when the request to change is a decrease request such that the set of virtual resources operate within a first subset of the set of data center units before modifying the set of data center units and operate within a second subset of the set of data center units different from the first subset of the set of data center units after modifying the set of data center units; and
wherein a given one of the virtual resources is managed by allocating two or more of data center units for operating the given virtual resource to emulate functionality of at least one of a physical device and software associated with the physical device.

9. The apparatus of claim 8, wherein the management circuit is configured to send a plurality of instructions related to modification of the value representing the number of data center units associated with a given service level included in the set of data center units currently assigned to a user to a plurality of resource controllers, and each resource controller from the plurality of resource controllers is configured to implement the predefined resource limit values.

10. The apparatus of claim 8, wherein two or more of the data center units currently assigned to the user are configured to operate respective sets of virtual resources associated with user identifier at two or more different service levels.

11. The apparatus of claim 8, wherein the management circuit is configured to operate for a plurality of hypervisor platforms, the set of virtual resources being associated with one of the plurality of hypervisor platforms.

12. A method of managing virtual resources, the method comprising:
managing virtual resources within a data center environment, the data center environment including a plurality of data center units, each data center unit including a grouping of different types of hardware resources which collectively meet predefined hardware resource limit values associated with one or more service levels, the managing using a database configured to keep track of and manage resources by processing the virtual resources as a function of the predefined hardware resource limit values for the service level, the database configured with fields for user identifier information, quantity of data center units associated with each service level assigned to each user, unit-based listings of data center units assigned to each user, virtual resource information regarding virtual resources associated with each user, and user preference information; and
modifying a value representing a number of data center units associated with a given service level included in a set of data center units currently assigned to a user in response to a user-generated request, wherein the modifying effects a change in the number of data center units associated with the given service level included in the set of data center units, the modifying including:
adding at least one data center unit associated with the given service level when the user-generated request is an increase request, said at least one data center unit comprising a data center unit associated with the given service level mutually exclusive from hardware resources of the set of data center units currently assigned to the user; and
modifying the set of data center units when the request is a decrease request;
wherein the user-generated request is generated automatically in response to identifying that a current performance of the set of data center units currently assigned to the user meets one or more threshold conditions for one or more performance metrics specified in the user preference information for the user stored in the database;

wherein modifying the set of data center units comprises modifying a distribution of a set of virtual resources operating within the set of data center units when the request to change is a decrease request such that the set of virtual resources operate within a first subset of the set of data center units before modifying the set of data center units and operate within a second subset of the set of data center units different from the first subset of the set of data center units after modifying the set of data center units; and wherein a given one of the virtual resources is managed by allocating two or more of data center units for operating the given virtual resource to emulate functionality of at least one of a physical device and software associated with the physical device.

13. The method of claim 12, wherein the threshold condition is satisfied when a utilization value is below a specified value for a specified period of time.

14. The method of claim 13, wherein a magnitude of the modification of the value representing the number of data center units is based on a magnitude of the utilization value relative to the threshold condition.

15. The method of claim 12, further comprising:
receiving authorization from the user to modify the value representing the number of data center units before modifying the value representing the number of data center units.

16. The apparatus of claim 8, wherein the management circuit comprises an application-specific integrated circuit, a digital signal processor, a field programmable gate array, a processor, or a combination thereof.

17. The apparatus of claim 8, wherein the modifying comprises:

identifying a given data center unit for removal from the set of data center units when the request to change is a decrease request; and associating the given data center unit with a pool of unassigned data center units.

18. The apparatus of claim 8, wherein the user is a first user, and wherein the modifying comprises:
reassigning at least one data center unit from the set of data center units currently assigned to the first user to another set of data center units currently assigned a second user when the request to change is a decrease request.

19. The method of claim 12, wherein the modifying comprises:
identifying a given data center unit for removal from the set of data center units when the request to change is a decrease request; and associating the given data center unit with a pool of unassigned data center units.

20. The method of claim 12, wherein the user is a first user, and wherein the modifying comprises:
reassigning at least one data center unit from the set of data center units currently assigned to the first user to another set of data center units currently assigned a second user when the request to change is a decrease request.

21. The apparatus of claim 8, wherein the set of predefined hardware resource limit values includes:
at least one of a processor speed limit value, a memory space limit value, or a network bandwidth limit value; and
at least one of a disk space limit value, a disk bandwidth limit value, or a disk input/output limit value.

* * * * *